(12) United States Patent  
Kawata

(10) Patent No.: US 7,663,396 B2  
(45) Date of Patent: Feb. 16, 2010

(54) SUBSTRATE FOR ELECTRO-OPTICAL DEVICE, ELECTRO-OPTICAL DEVICE, AND CHECKING METHOD

(75) Inventor: Hirotaka Kawata, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 641 days.

(21) Appl. No.: 11/618,141

(22) Filed: Dec. 29, 2006

(65) Prior Publication Data

US 2008/0012815 A1  Jan. 17, 2008

(30) Foreign Application Priority Data

Feb. 2, 2006 (JP) .............................. 2006-026008

(51) Int. Cl.
*G01R 31/00* (2006.01)
*G09G 3/36* (2006.01)
*H01L 31/0232* (2006.01)

(52) U.S. Cl. ............................. 324/770; 345/89; 257/72

(58) Field of Classification Search ........................ None
See application file for complete search history.

(56) References Cited

U.S. PATENT DOCUMENTS

| 6,346,717 | B1 * | 2/2002 | Kawata ........................ 257/72 |
| 6,781,815 | B2 * | 8/2004 | Kurumisawa ................ 361/302 |
| 7,268,416 | B2 * | 9/2007 | Furihata ..................... 257/678 |
| 7,336,030 | B2 * | 2/2008 | Funamoto et al. ............ 313/506 |
| 2003/0016508 | A1 * | 1/2003 | Kurumisawa ................ 361/749 |
| 2004/0079937 | A1 * | 4/2004 | Miyazawa .................... 257/10 |
| 2006/0060851 | A1 * | 3/2006 | Kawata ........................ 257/59 |
| 2007/0200810 | A1 * | 8/2007 | Kawata ........................ 345/89 |
| 2008/0012812 | A1 * | 1/2008 | Kawata ........................ 345/90 |
| 2009/0001884 | A1 * | 1/2009 | Nakanishi ................... 313/505 |

FOREIGN PATENT DOCUMENTS

JP  A 10-260391  9/1998

* cited by examiner

*Primary Examiner*—Jermele M Hollington
(74) *Attorney, Agent, or Firm*—Oliff & Berridge, PLC

(57) ABSTRACT

A substrate for an electro-optical device includes a plurality of scanning lines arranged in rows; a plurality of data lines arranged in columns and grouped into blocks, each of the blocks including n data lines, where n indicates an integer of 2 or more; a plurality of terminals that receive data signals for the corresponding blocks; a demultiplexer that selects a data line designated by a control signal from among the n data lines within each of the blocks and that supplies to the data line selected in the block the corresponding data signal received by the corresponding terminal for the block; a plurality of pixels disposed in association with intersections of the plurality of scanning lines and the plurality of data lines, some or all of the plurality of pixels performing display in accordance with the data signals supplied to the data lines when selection of the corresponding scanning lines is performed; and a checking circuit. The checking circuit includes n read lines; a plurality of first switches each provided for a different data line, one end of each of the plurality of first switches being connected to a corresponding data line and the other end of each of the plurality of first switches being connected to one of the n read lines such that the other ends of the plurality of first switches corresponding to the n data lines belonging to an identical block are connected to different read lines; and a shift register that selects one of the blocks so as to allow conduction of first switches whose other ends are connected to the n data lines belonging to the selected block.

5 Claims, 6 Drawing Sheets

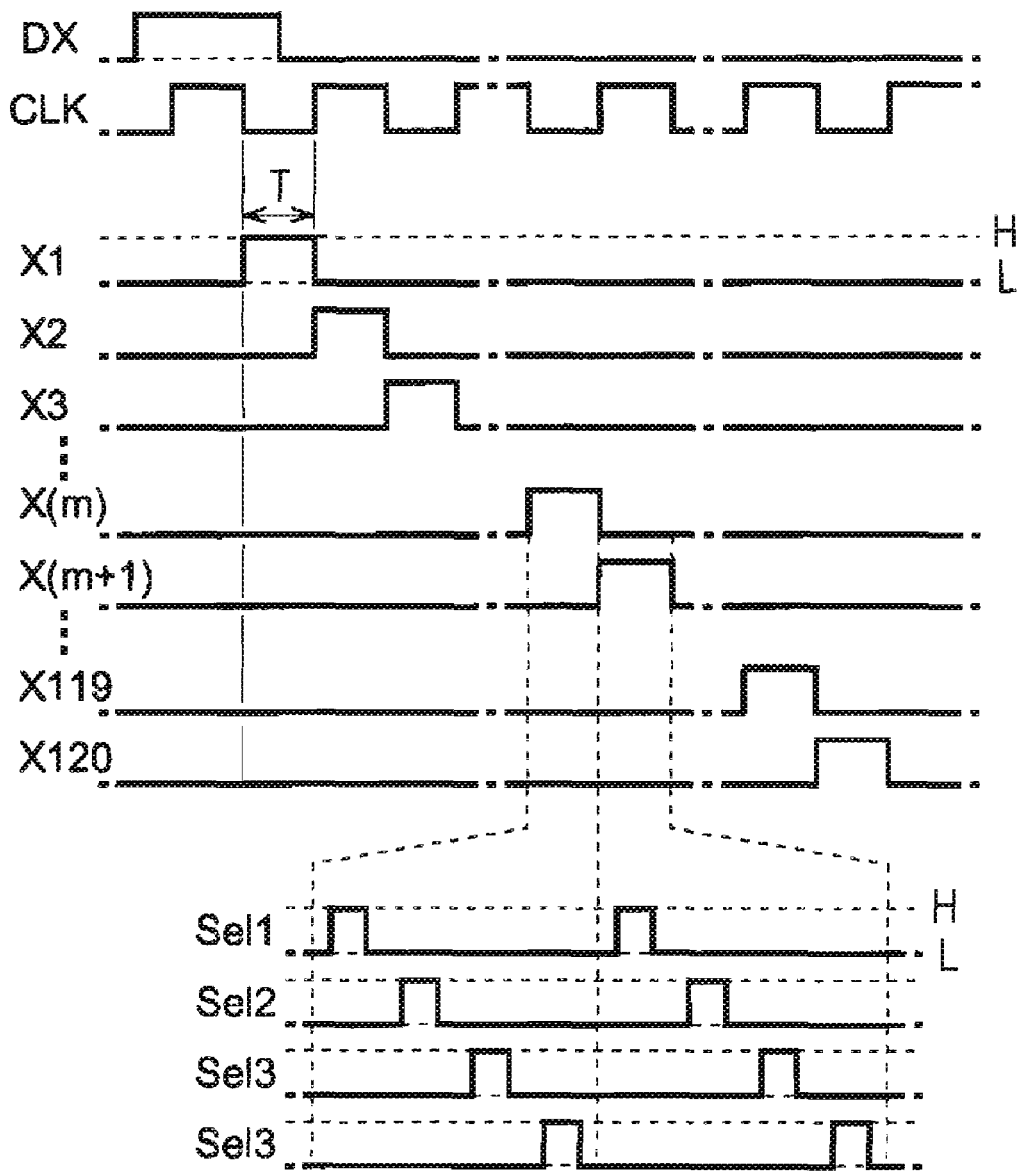

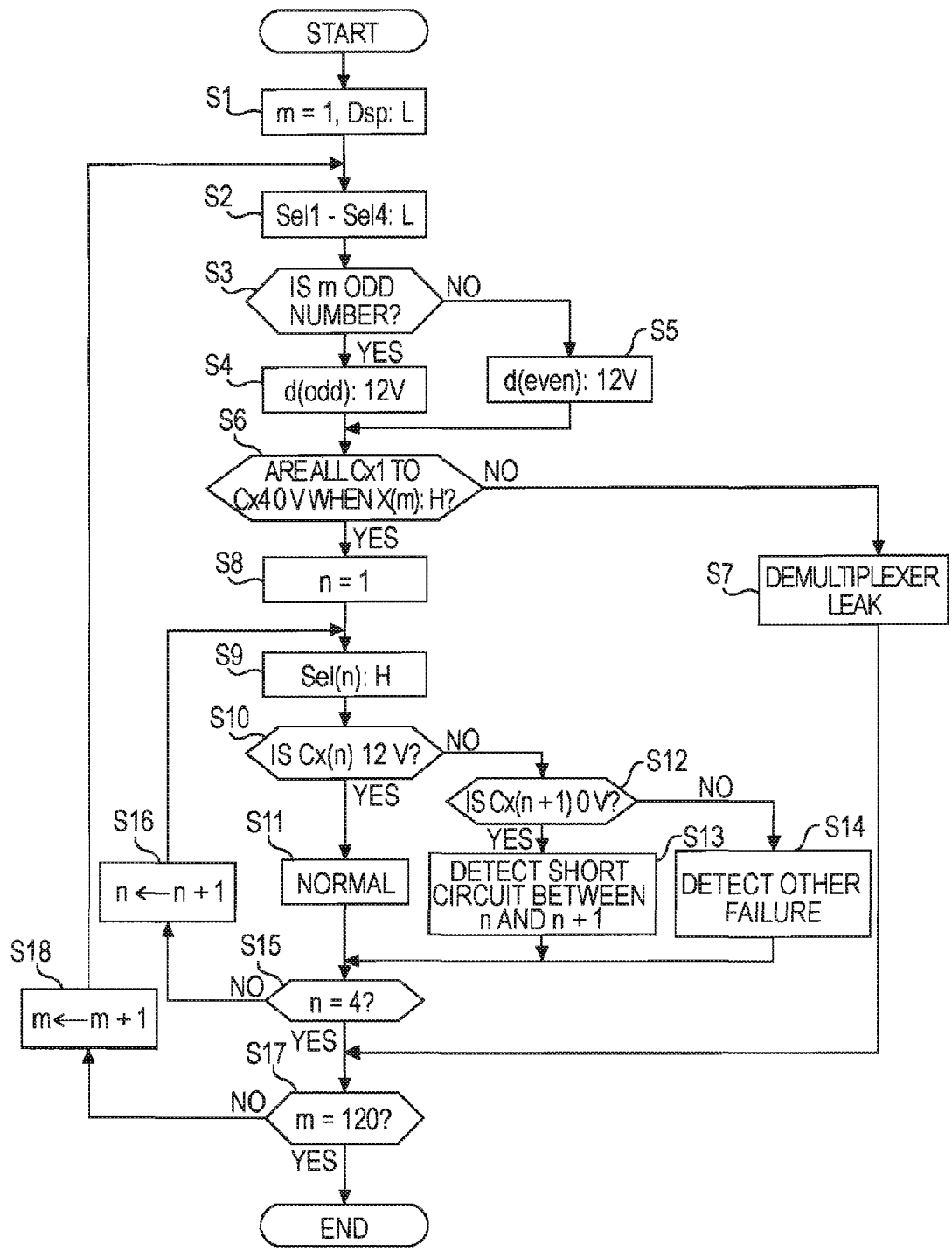

SUBSTRATE FOR ELECTRO-OPTICAL DEVICE, ELECTRO-OPTICAL DEVICE, AND CHECKING METHOD

BACKGROUND

1. Technical Field

The present invention relates to a technology for checking for failures of electro-optical devices, such as liquid crystal display devices.

2. Related Art

In electro-optical devices that form images using electro-optical characteristics of liquid crystal or the like, a checking operation for determining whether or not a failure occurs is normally executed in the process of manufacturing in order to prevent a negative effect on post-processes. In particular, in active-matrix electro-optical devices, determination as to whether or not a failure occurs is important since an active element, such as a transistor for switching on and off a pixel, is formed on an element substrate. In addition, in electro-optical devices containing a peripheral circuit, such a checking operation is much more important since part or all of a drive circuit is formed, together with an active element for switching on and off a pixel, on an element substrate.

Thus, a technology for determining whether or not a failure occurs is suggested, for example, in JP-A-10-260391. The determination is performed by monitoring an output signal of a checking circuit prepared in advance in an electro-optical device.

However, for electro-optical devices based on a demultiplexer system called hybrid electro-optical devices, it is difficult to achieve a satisfactory checking operation due to the recent development of high-definition displays. More specifically, in a demultiplexer system in which data signals to be supplied to n data lines are input in a time-division manner and in which the n data lines are selected one by one in the time-division manner, a so-called X driver does not exist. Thus, for example, checking as to whether or not data lines adjacent to each other are short-circuited cannot be executed.

SUMMARY

An advantage of some aspects of the invention is that it provides a substrate for an electro-optical device based on a demultiplexer system that is capable of executing an appropriate checking operation, an electro-optical device based on the demultiplexer system that is capable of executing an appropriate checking operation, and a checking method capable of executing an appropriate checking operation.

According to an aspect of the invention, a substrate for an electro-optical device includes a plurality of scanning lines arranged in rows; a plurality of data lines arranged in columns and grouped into blocks, each of the blocks including n data lines, where n indicates an integer of 2 or more; a plurality of terminals that receive data signals for the corresponding blocks; a demultiplexer that selects a data line designated by a control signal from among the n data lines within each of the blocks and that supplies to the data line selected in the block the corresponding data signal received by the corresponding terminal for the block; a plurality of pixels disposed in association with intersections of the plurality of scanning lines and the plurality of data lines, some or all of the plurality of pixels performing display in accordance with the data signals supplied to the data lines when selection of the corresponding scanning lines is performed; and a checking circuit. The checking circuit includes n read lines; a plurality of first switches each provided for a different data line, one end of each of the plurality of first switches being connected to a corresponding data line and the other end of each of the plurality of first switches being connected to one of the n read lines such that the other ends of the plurality of first switches corresponding to the n data lines belonging to an identical block are connected to different read lines; and a shift register that selects one of the blocks so as to allow conduction of first switches whose other ends are connected to the n data lines belonging to the selected block. Accordingly, in a so-called hybrid element substrate, the position of a demultiplexer or a data line where a failure occurs can be easily identified.

In addition, some or all of a plurality of pixels may be formed. This is because a checking operation may be executed when all the pixels do not perform display (that is, only some of the pixels are formed).

The shift register may output a shift signal in accordance with the selection of the block via a corresponding one of a plurality of output terminals of the shift register. Each of the plurality of first switches may include a transistor whose gate receives the shift signal. The checking circuit may further include a plurality of second switches each causing a corresponding output terminal of the shift register to have an OFF voltage of the transistor forming the corresponding first switch when the plurality of pixels perform display. In addition, the checking circuit may be formed on a side opposite to the demultiplexer such that an alignment area of the plurality of pixels is arranged between the checking circuit and the demultiplexer.

An aspect of the invention may include an electro-optical device or a checking method. According to an aspect of the invention, a method for checking an electro-optical device including a plurality of scanning lines arranged in rows, a plurality of data lines arranged in columns and grouped into blocks, each of the blocks including n data lines, where n indicates an integer of 2 or more, a plurality of terminals that receive data signals for the corresponding blocks, a demultiplexer that selects a data line designated by a control signal from among the n data lines within each of the blocks and that supplies to the selected data line the corresponding data signal received by the corresponding terminal, a plurality of pixels disposed in association with intersections of the plurality of scanning lines and the plurality of data lines, some or all of the plurality of pixels performing display in accordance with the data signals supplied to the data lines when selection of the corresponding scanning lines is performed, and a checking circuit, wherein the checking circuit includes n read lines and a plurality of first switches each provided for a different data line, one end of each of the plurality of first switches being connected to a corresponding data line and the other end of each of the plurality of first switches being connected to one of the n read lines such that the other ends of the plurality of first switches corresponding to the n data lines belonging to an identical block are connected to different read lines includes supplying a data signal of a predetermined voltage to a terminal corresponding to at least one block from among the plurality of terminals; supplying to the demultiplexer a control signal for deselecting all the n data lines grouped into the blocks; turning on first switches whose other ends are connected to the n data lines belonging to the at least one block corresponding to the terminal to which the data signal of the predetermined voltage is supplied; and determining whether or not all the n read lines are at the predetermined voltage. Thus, in a demultiplexer, a data line where a failure occurs can be identified.

According to another aspect of the invention, a method for checking an electro-optical device including a plurality of scanning lines arranged in rows, a plurality of data lines arranged in columns and grouped into blocks, each of the blocks including n data lines, where n indicates an integer of 2 or more, a plurality of terminals that receive data signals for the corresponding blocks, a demultiplexer that selects a data line designated by a control signal from among the n data lines within each of the blocks and that supplies to the selected data line the corresponding data signal received by the corresponding terminal, a plurality of pixels disposed in association with intersections of the plurality of scanning lines and the plurality of data lines, some or all of the plurality of pixels performing display in accordance with the data signals supplied to the data lines when selection of the corresponding scanning lines is performed, and a checking circuit, wherein the checking circuit includes n read lines and a plurality of first switches each provided for a different data line, one end of each of the plurality of first switches being connected to a corresponding data line and the other end of each of the plurality of first switches being connected to one of the n read lines such that the other ends of the plurality of first switches corresponding to the n data lines belonging to an identical block are connected to different read lines includes supplying a data signal of a predetermined voltage to a terminal corresponding to at least one block from among the plurality of terminals; supplying to the demultiplexer a control signal for selecting one of the n data lines grouped into the blocks; turning on first switches whose other ends are connected to the n data lines belonging to the at least one block corresponding to the terminal to which the data signal of the predetermined voltage is supplied; and determining whether or not a read line connected to the other end of the first switch corresponding to the one of the n data lines selected by the demultiplexer from among the n read lines is at the predetermined voltage. Thus, a data line where a failure occurs can be identified.

BRIEF DESCRIPTION OF THE DRAWINGS

The invention will be described with reference to the accompanying drawings, wherein like numbers reference like elements.

FIG. 3 is a timing chart showing a checking operation for the electro-optical device.

FIG. 4 is a flowchart of the checking operation for the electro-optical device,

DESCRIPTION OF EXEMPLARY EMBODIMENTS

Figure 1:
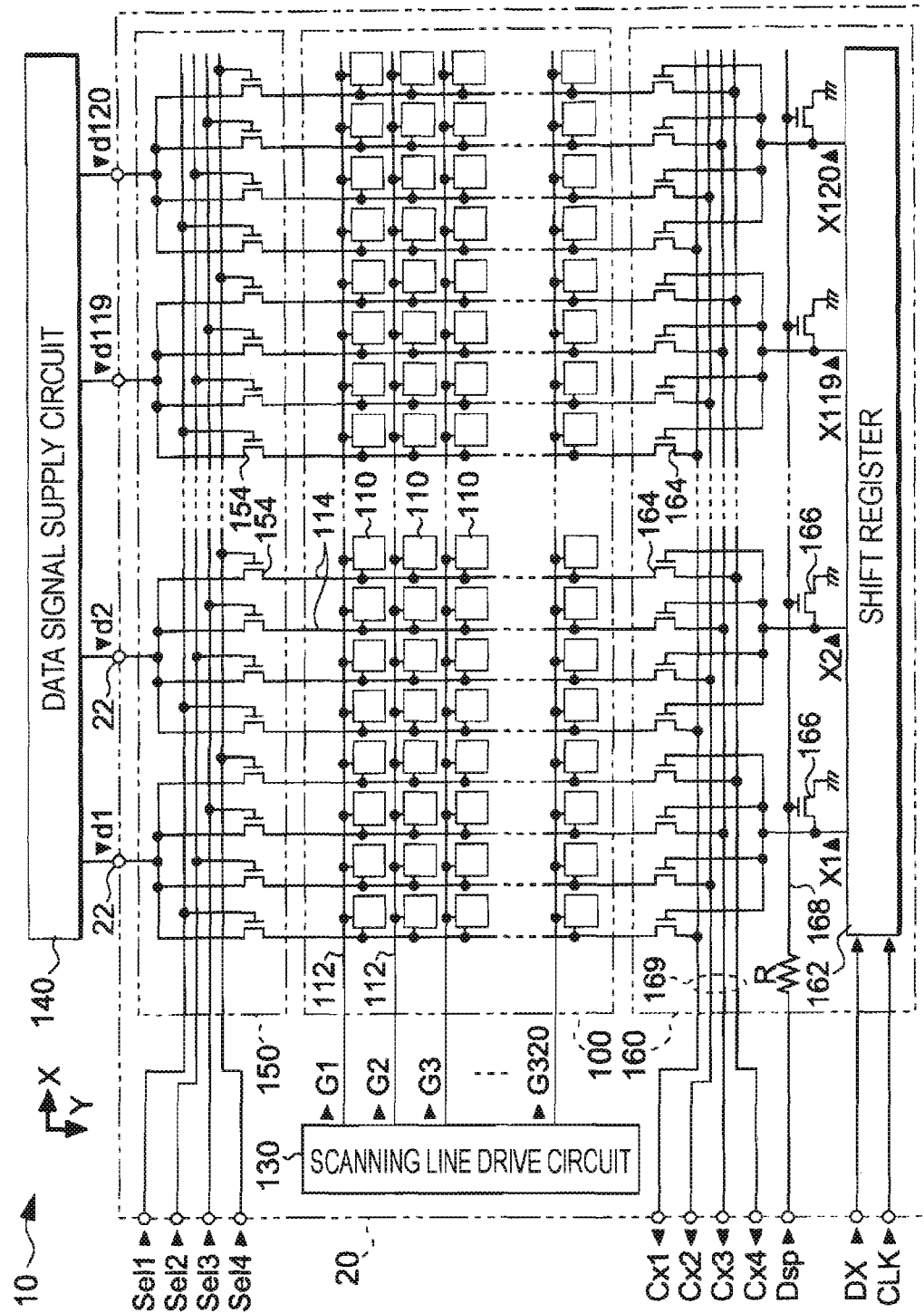
FIG. 1 is a block diagram showing a configuration of an electro-optical device according to an embodiment of the invention.

Embodiments of the invention will be described with reference to the drawings. FIG. 1 is a block diagram showing a configuration of an electro-optical device subjected to a checking operation in an embodiment of the invention.

Referring to FIG. 1, in a state where an electro-optical device 10 is completed (a display operation is performed), a data signal supply circuit 140 is connected to an element substrate 20. On the element substrate 20, a demultiplexer 150 is disposed on one of X-sides of the periphery of a display area 100. The side on which the demultiplexer 150 is disposed is connected to the data signal supply circuit 140. In addition, on the element substrate 20, a checking circuit 160 is disposed on the other one of the X-sides of the periphery of the display area 100. The side on which the checking circuit 160 is disposed is opposite to the side on which the demultiplexer 150 is disposed. In addition, on the element substrate 20, a scanning line drive circuit 130 is disposed on a Y-side of the periphery of the display area 100.

In the display area 100, 320 scanning lines 112 extend in a row (X) direction, and 480 (=120×4) data lines 114, which are combined into groups each including four lines, extend in a column (Y) direction. The data lines 114 are electrically insulated from the scanning lines 112.

Pixels 110 are disposed in association with intersections between the 320 scanning lines 112 and the 480 data lines 114. Thus, in this embodiment, the pixels 110 are arranged in a matrix of 320 rows and 480 columns. In the invention, however, the pixels 110 are not necessarily arranged as described above. In order to distinguish among four data lines 114 within a group, the data lines 114 may be referred to as an a-series data line, a b-series data line, a c-series data line, and a d-series data line from left to right.

More Specifically, data lines 114 in the 1st column, in the 5th column, in the 9th column, . . . , and in the 477th column are a-series data lines, data lines 114 in the 2nd column, in the 6th column, in the 10th column, . . . , and in the 478th column are b-series data lines, data lines 114 in the 3rd column, in the 7th column, in the 11th column, . . . , and in the 479th column are c-series data lines, and data lines 114 in the 4th column, in the 8th column, in the 12th column, . . . , and in the 480th column are d-series data lines.

In addition, in a state where the electro-optical device 10 is completed, the element substrate 20 and a counter substrate are bonded to each other with a predetermined space therebetween, and liquid crystal is filled in the space. In an embodiment of the invention, checking is executed on the element substrate 20 before a counter substrate is bonded to the element substrate 20.

Figure 2A:
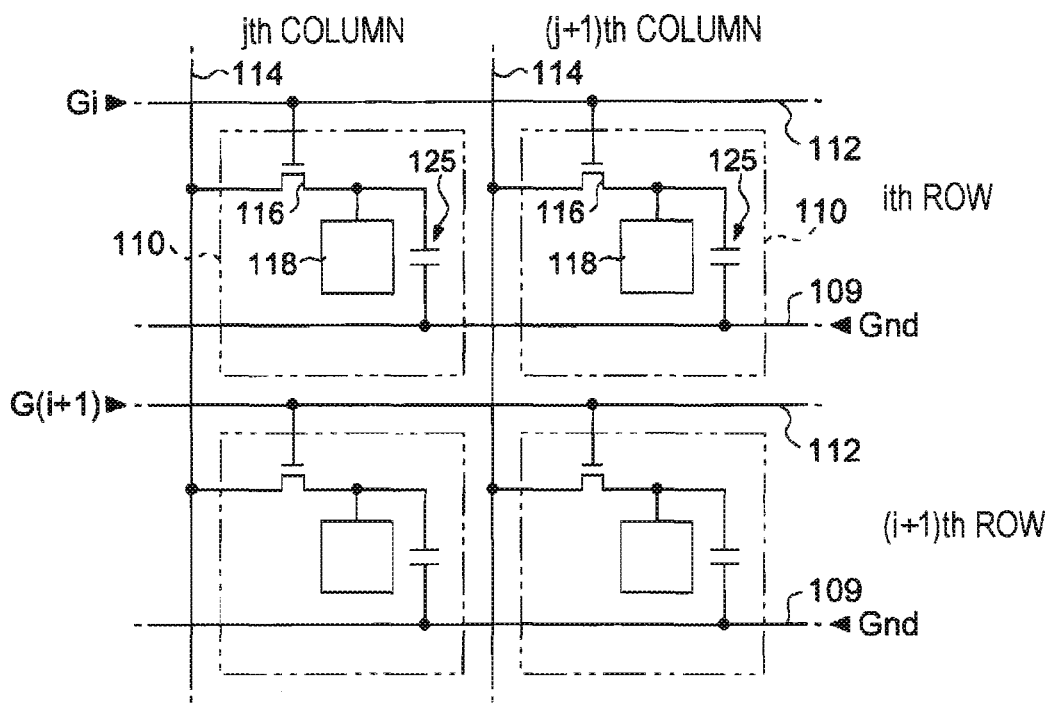
FIGS. 2A and 2B show configurations of pixels in the electro-optical device.
Figure 2B:
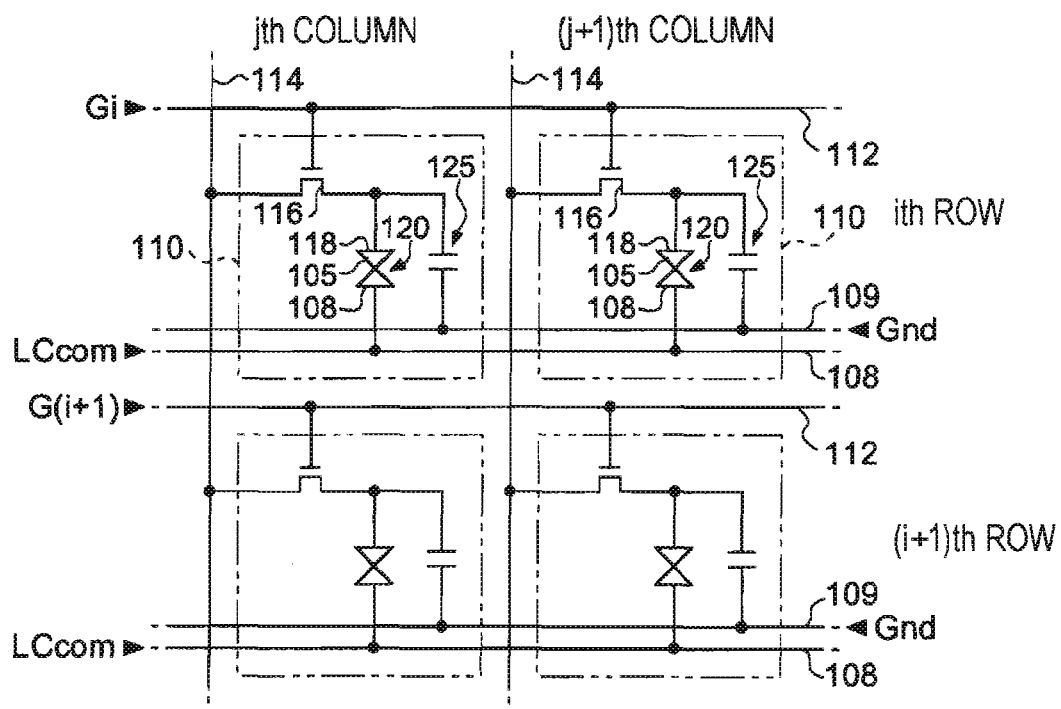

FIGS. 2A and 2B show configurations of the pixels 110. FIG. 2A shows a state of the element substrate 20 before a counter substrate is bonded to the element substrate 20. FIG. 2B shows a state of the element substrate 20 after a counter substrate is bonded to the element substrate 20 and liquid crystal is filled into a space between the element substrate 20 and the counter substrate. FIGS. 2A and 2B show configurations of four pixels (two rows and two columns) disposed in association with intersections of the ith row and the (i+1)th row, which is adjacent to the ith row, and the jth column and the (j+1)th column, which is adjacent to the jth column.

Reference signs "i" and "(i+1)" generally indicate rows in which the pixels 110 are disposed and represent integers between 1 and 320. Reference signs "j" and "(j+1)" generally indicate columns in which the pixels 110 are disposed and represent integers between 1 and 480.

Since all the pixels 110 have the same electrical configurations, the pixel 110 disposed in the ith row and the jth column will be described as a typical pixel.

On the element, substrate 20 in the checking stage, the pixel 110 includes an n-channel thin-film transistor (hereinafter, simply referred to as a TFT) 116, a pixel electrode 118, and a storage capacitor 125, as shown in FIG. 2A. The gate of the TFT 116 is connected to the scanning line 112 in the ith row, the source of the TFT 116 is connected to the data line 114 in the jth column, and the drain of the TFT 116 is connected to the pixel electrode 118 and one end of the storage capacitor 125. The other end of the storage capacitor 125 is connected to a common capacitor line 109. In this embodiment, the capacitor line 109 is grounded, for example, to a potential Gnd, which is a voltage reference.

A counter substrate on which a counter electrode 108 is formed is bonded to the element substrate 20 described above with a predetermined space therebetween such that surfaces on which electrodes are formed face each other and that liquid crystal 105 is filled in the space. Thus, a liquid crystal capacitor 120 in which the liquid crystal 105 is sandwiched between the pixel electrode 118 and the counter electrode 108 is formed, as shown in FIG. 2B. The counter electrode 108 is common to all the pixels 110, and a temporally constant voltage LCcom is applied to the counter electrode 108.

In addition, in this embodiment, when the liquid crystal 105 to be filled into the space is twisted-nematic liquid crystal, alignment films subjected to rubbing treatment in which the long axis of a liquid crystal molecule is continuously twisted at about 90 degrees between the substrates are provided on the surfaces of the substrates that face each other. Thus, if the voltage effective value held in the liquid crystal capacitor 120 is zero, light transmitting between the pixel electrode 118 and the counter electrode 108 rotates at about 90 degrees along twisting of a liquid crystal molecule. However, if the voltage effective value increases, the liquid crystal molecule tilts in an electric field direction, thus losing optical activity. Thus, for example, in transmissive liquid crystal, polarizers are disposed on the incident side and the rear side such that polarizing axes correspond to an alignment direction. In this case, the smaller the voltage effective value, the higher the light transmittance. Thus, a brighter display (normally white mode) can be achieved.

Referring back to FIG. 1, the scanning line drive circuit 130 is formed on the element substrate 20. When a display operation is performed, scanning signals G1, G2, G3, . . . , and G320 are supplied to the scanning lines 112 in the 1st, 2nd, 3rd, . . . , and 320th rows. More specifically, the scanning line drive circuit 130 selects the scanning lines 112 in the 1st, 2nd, 3rd, . . . , and 320th rows in order over a frame period. A scanning signal to be supplied to a selected scanning line is at the H level, which corresponds to a selected voltage. Scanning signals to be supplied to the other scanning lines are at the L level, which corresponds to an unselected voltage.

In this embodiment, a logical signal exhibits a ground potential Gnd (0 V) at the L level, and exhibits a power supply voltage Vdd (for example, 15 V) at the H level.

The data signal supply circuit 140 is provided independent of the element substrate 20. In a state where the electro-optical device 10 is completed and a display operation is performed, the data signal supply circuit 140 is connected to the element substrate 20 with terminals 22 therebetween. The data signal supply circuit 140 outputs to a pixel corresponding to a scanning line 112 selected by the scanning line drive circuit 130 and a data line selected by the demultiplexer 150 from among four data lines 114 belonging to each block a data signal at a voltage corresponding to a grayscale level of the pixel. When a checking operation is executed, instead of the data signal supply circuit 140, probes are connected to the element substrate 20, so that data signals for the checking operation are supplied.

As described above, in this embodiment, the "480" data lines 114 are grouped into blocks each including four lines. Thus, "120" terminals 22 are provided. For the sake of easier explanation, data signals to be supplied to the element substrate 20 corresponding to the 1st to 120th blocks are referred to as d1 to d120, irrespective of whether or not the data signal supply circuit 140 is connected to the element substrate 20.

The demultiplexer 150 is formed on the element substrate 20. In addition, the demultiplexer 150 includes thin-film transistors (TFTs) 154 provided for the respective data lines 114. Each of the TFTs 154 is an N-channel transistor. The drain of each of the TFTs 154 is connected to one end of a corresponding data line 114. The sources of four TFTs 154 corresponding to data lines 114 belonging to the same block are connected to each other, so that a data signal corresponding to the block is supplied to the data lines 114.

That is, the mth block is constituted by the (4m−3)th data line 114, which is an a-series data line, the (4m−2)th data line 114, which is a b-series data line, the (4m−1)th data line 114, which is a c-series data line, and the (4m)th data line 114, which is a d-series data line. The sources of the TFTs 154 corresponding to the four data lines 114 are connected to each other, so that a data signal d(m) is supplied to the four data lines 114. A control signal Sel1 is supplied to the gate of the TFT 154 corresponding to the (4m−3)th data line 114. Similarly, control signals Sel2, Sel3, and Sel4 are supplied to the gates of the TFTs 154 corresponding to the (4m−2)th data line 114, the (4m−1)th data line 114, and the (4m)th data line 114, respectively.

Reference sign "m" generally indicates a block, and represents an integer between 1 and 120. In the description given below for explaining an operation for checking, "m" is incremented by 1 from 1 to 120.

The checking circuit 160 includes a shift register 162 and TFTs 164 provided for the respective data lines 114.

In a checking operation, the shift register 162 sequentially shifts transfer start pulses DX supplied from a checking control circuit (not shown) in accordance with a clock signal CLK, and outputs shift signals X1, X2, X3, X4, . . . , and X120 for the respective blocks, as shown in FIG. 3.

For example, the shift register 162 is configured to sequentially delay the transfer start pulses DX each having a pulse width of about a cycle of a clock signal CLK at a point in time when the logical level of the clock signal CLK changes and to output, as shift signals X1, X2, X3, X4, . . . , and X120, logical multiplication signals of delayed signals adjacent to each other.

Thus, the checking control circuit is capable of recognizing which shift signal is at the H level in accordance with the number of cycles of the clock signal CLK supplied after a transfer start pulse DX is output.

The TFTs (first switches) 164 are N-channel transistors. The source (one end) of each of the TFTs 164 is connected to the other end of a corresponding data line 114. The gates of four TFTs 164 corresponding to data lines 114 belonging to the same block are connected to each other, so that a shift signal corresponding to the block can be supplied to the data lines 114.

That is, a shift signal X(m) is commonly supplied by the shift register 162 to the gates of the TFTs 164 corresponding to the (4m−3)th data line 114, the (4m−2)th data line 114, the (4m−1)th data line 114, and the (4m)th data line 114 that constitute the mth block.

The drains (the other ends) of TFTs 164 corresponding to a-series data lines 114 in the 1st to 120th blocks are commonly connected to a read line read as a signal Cx1 from among four read lines 169, which correspond to data lines constituting each block. Similarly, the drains of the TFTs 164 corresponding to b-series data lines 114, c-series data lines 114, and d-series data lines 114 are commonly connected to corresponding read lines read as signals Cx2, Cx3, and Cx4 respectively, from among the four read lines 169.

The checking circuit 160 also includes TFTs 166 corresponding to output terminals of the shift register 162 and a signal line 168. The TFTs 166 (second switches) are N-channel transistors. The sources of the TFTs 166 are commonly grounded to a potential Gnd, and the drains of the TFTs 166 are connected to output terminals of the shift register 162. The gates of the TFTs 166 are commonly connected to the signal line 168.

Component elements of the scanning line drive circuit 130, the TFTs 154 serving as component elements of the demultiplexer 150, component elements of the shift register 162, the TFTs 166, and the like are formed on the element substrate 20 in the manufacturing process of the display area 100. Thus, the element substrate 20 contains the scanning line drive circuit 130, the demultiplexer 150, and the checking circuit 160 as peripheral circuits of the display area 100.

A checking operation of the element substrate 20 of the electro-optical device 10 will now be described.

FIG. 3 is a timing chart showing the signal waveform of each unit in a checking operation. FIG. 4 is a flowchart showing the checking operation.

As described above, checking of the element substrate 20 is executed before the element substrate 20 is bonded to a counter substrate. More specifically, the data signal supply circuit 140 shown in FIG. 1 is not connected to the element substrate 20. Instead, a checking control circuit (not shown) supplies the data signals d1 to d120 via probes contacted to the terminals 22, and supplies the control signals Sel1 to Sel4, the transfer start pulses Dx, the clock signals CLK, and signals Dsp to the element substrate 20.

The checking operation will be described with reference to FIG. 4. In step S1, the checking control circuit executes an initial setting operation. That is, the checking control circuit sets a variable m, which corresponds to a block number of data lines, to "1", and sets a signal Dsp at the L level over the period in which the checking operation is executed. Thus, all the TFTs 166 are turned off.

Then, in step S2, the checking control circuit sets the control signals Sel1 to Sel4, which are to be supplied to the demultiplexer 150, to the L level.

In step S3, the checking control circuit determines whether or not the variable m at the present time is an odd number (1, 3, 5, ..., or 119). When the processing of step S3 is performed for the first time, since the variable m is set to "1", the checking control circuit determines that the variable m is an odd number. Since the variable m is incremented by "1" every time the processing of step S18, which will be described below, is performed, the variable m may be an even number (2, 4, 6, ..., or 120).

If it is determined in step S3 that the variable m is an odd number, data signals d1, d3, d5, ..., and d119 corresponding to odd-numbered blocks at a voltage of, for example, 12 V, which is slightly lower than the power supply voltage 15V, and the other data signals at a voltage of 0 V are supplied from the data signal supply circuit 140 in step S4. If it is determined in step S3 that the variable m is an even number, data signals d2, d4, d6, ..., and d120 corresponding to even-numbered blocks at a voltage of 12 V and the other data signals at a voltage of 0 V are supplied from the data signal supply circuit 140 in step S5.

In step S6, the checking control circuit inverts the logical level of a clock signal CLK so that a shift signal X(m) corresponding to the variable m at the present time is set to the H level, and determines whether or not all the signals Cx1 to Cx4 are at 0 V. If the processing of step S6 is performed for the first time, the checking control circuit sets a transfer start pulse Dx to the H level, sets the clock signal CLK to the H level and then to the L level, and sets the shift signal X1 to the H level.

At least a data signal corresponding to a block having the variable m at the present time, from among data signals supplied from the data signal supply circuit 140, is at 12 V. Since all the control signals Sel1 to Sel4 are at the L level, the voltages of data lines belonging to the block having the variable m should be 0 V.

When the shift signal X(m) reaches the H level, the TFTs 164 corresponding to the mth block are turned on, and the voltages of the a-series data line, the b-series data line, the c-series data line, and the d-series data line belonging the block having the variable m are read as the signals Cx1 to Cx4 through the read line 169. Here, if all the signals Cx1 to Cx4 are not 0 V, it is determined that a failure occurs in the demultiplexer 150. More specifically, it is determined that, although the TFTs 154 provided for the block having the variable m should be turned off, the TFTs 154 are turned on or are almost turned on. Thus, if all the signals Cx1 to Cx4 are not at 0 V, the checking control circuit stores the variable m at the present time and the number of a signal Cx that exhibits a value other than 0 V in step S1.

For example, when the variable m is "2", the signal Cx3 is not at 0 V. In this case, it is determined that a failure occurs in the TFT 154 corresponding to the c-series data line in the 2nd block, that is, the 7th data line 114, from among the TFTs 154 constituting the demultiplexer 150. Thus, the checking control circuit stores a pair of the number "2", which indicates the variable number m, and the number "3", which indicates the signal Cx3.

If all the signals Cx1 to Cx4 are at 0 V, it is determined that no failure occurs in TFTs 154 corresponding to the mth block. Thus, in order to change an object to be checked, the checking control circuit sets a variable n, which corresponds to a series of data lines in blocks, to "1" in step S8.

In step S9, only a signal Sel(n) corresponding to the variable n is set to the H level in step S3. For example, when the variable n is set to "1", which is an initial value, only the signal Sel1 is set to the H level, and the other signals Sel2 to Sel4 are set to the L level.

In step S10, the checking control circuit determines whether or net the signal Cx(n) corresponding to the variable n at the present time, from among the input signals Cx1 to Cx4, is at 12 V.

From among data signals supplied from the data signal supply circuit 140, at least a data signal corresponding to the variable m at the present time is at 12 V, and only the control signal Sel(n) corresponding to the variable m is at the H level. Thus, if no failure occurs, a data signal at a voltage of 12 V should be sampled from a data line of a series corresponding to the variable n, from among data lines belonging to a block corresponding to the variable m at the present time. Thus, if it is determined in step S10 that the signal Cx(n) corresponding to the variable n is at 12 V, it is determined that the data line of the series corresponding to the variable n is normal (step S11).

If it is determined in step S10 that the signal Cx(n) corresponding to the variable n at the present time is not 12 V, a failure may occur in the data line of the series corresponding to the variable n. Thus, the checking control circuit determines whether or not the voltage of a signal Cx(n+1), that is, the voltage of the data line at the immediate right of the data line of the series corresponding to the variable n, is at 0 V in step S12.

A voltage other than 0 V should be sampled only from the data line of the series corresponding to the variable n, from among data lines belonging to the mth block. Thus, if the voltage of the signal Cx(n+1) is not 0 V, this voltage is caused by leakage from the data line of the series corresponding to the variable n to the data line at the immediate right of the data line of the series corresponding to the variable n. That is, the reason why the data line of the series corresponding to the variable n from among the data lines belonging to the mth block is not at 12 V is that the delta line corresponding to the variable n and the adjacent line electrically contact each other for a certain reason.

That is, if it is determined in step S12 that the voltage of the signal Cx(n+1) is not 0 V, the checking control circuit determines that the data line of the series corresponding to the variable n and the data line at the immediate right of the data line of the series corresponding to the variable n, from among the data lines belonging to the mth block, are short circuited (step S13).

If it is determined in step S12 that the signal Cx(n+1) is at 0 V, the checking control circuit determines that another type of failure, such as disconnection of the data line of the series corresponding to the variable n in the middle thereof or short circuit between the data line of the series corresponding to the variable n and another signal line (for example, the capacitor line 109 at a ground potential Gnd or the scanning line 112), occurs (step S14).

By the processing of step S12 and step S13 or S14, failure checking for the data line of the series corresponding to the variable n at the present time in the mth block is terminated. Thus, in step S15, the checking control circuit determines whether or not the variable n at the present time is "4", which is the upper limit in this embodiment. If it is determined in step S15 that the variable n is not "4", the variable n is incremented by "1" in step S16. Then, the data line to be checked is shifted to the immediately right data line, and the process returns to step S9. Accordingly, by the processing of steps S9 to S14, determination as to whether or not a failure occurs is performed on the data line of the series corresponding to the incremented variable n.

If it is determined in step S15 that the variable n is "4", which is the upper limit, failure checking has already been performed for the a-series data line (n=1) to the d-series data line (n=4) in the block corresponding to the variable m. Thus, the checking control circuit determines whether or not the variable m at the present time is "120", which is the upper limit of the number of blocks in this embodiment, in step S17. If it is determined in step S17 that the variable m at the present time is not "120", the variable m is incremented by "1" in step S18, so that the block to be checked is shifted to the next block. Then, the process returns to step S2. Accordingly, by the processing of steps S2 to S16, determination as to whether or not a failure occurs is performed on the block corresponding to the incremented variable m.

If it is determined in step S17 that the variable m is "120", since the determination as to whether or not a failure occurs has already been performed on the d-data line of the 120th block, the checking control circuit terminates the checking operation.

As described above, in this embodiment, the variable m is incremented by "1" from the initial value "1" to "120", and the shift signals X1, X2, X3, . . . , and X120 are sequentially and exclusively set to the H level, as shown in FIG. 3 In addition, when the shift signal X(m) corresponding to the variable m is set to the H level, the variable n is incremented by "1" from the initial value "1" to "4", so that checking is performed on the a-series data line 114 to the d-series data line 114 one by one.

Thus, according to this embodiment, for the hybrid-driven element substrate, together with the demultiplexer 150, failure checking is performed on the data lines 114 one by one, so that the position where a failure occurs can be identified.

If the element substrate 20 is determined to be normal as a result of checking, a feeder line of the power supply (Vdd-Gnd) to the shift register 162 of the checking circuit 160 is cut, and the element substrate 20 is bonded to a counter substrate with a predetermined space therebetween, so that liquid crystal is filled into the space.

When the electro-optical device 10 in the production stage performs display, a power supply voltage Vdd, that is, a logical signal at the H level, is always supplied as a signal Dsp. Thus, the signal line 168 is pulled up via a resistor R, so that the TFTs 166 are always in the ON-state. When the feeder line to the shift register 162 is cut, the output terminals of the shift register 162 are in a floating state with an unstable potential. However, since the output terminals are always grounded at the potential Gnd in the display operation due to turning on of the TFTs 166, the TFTs 164 are turned off. Thus, since the checking circuit 160 is electrically disconnected from the display area 100 when the electro-optical device 10 performs display, no influence is exerted on the display operation described below.

The display operation will be briefly explained.

In order to perform the display operation, the data signal supply circuit 140 is connected, as described above, and the control signals Sel1 to Sel4 and signals (not shown) for controlling the scanning line drive circuit 130 are supplied from a host controller. In addition, as described above, a logical signal at the H level is always supplied as a signal Dsp.

Figure 5:
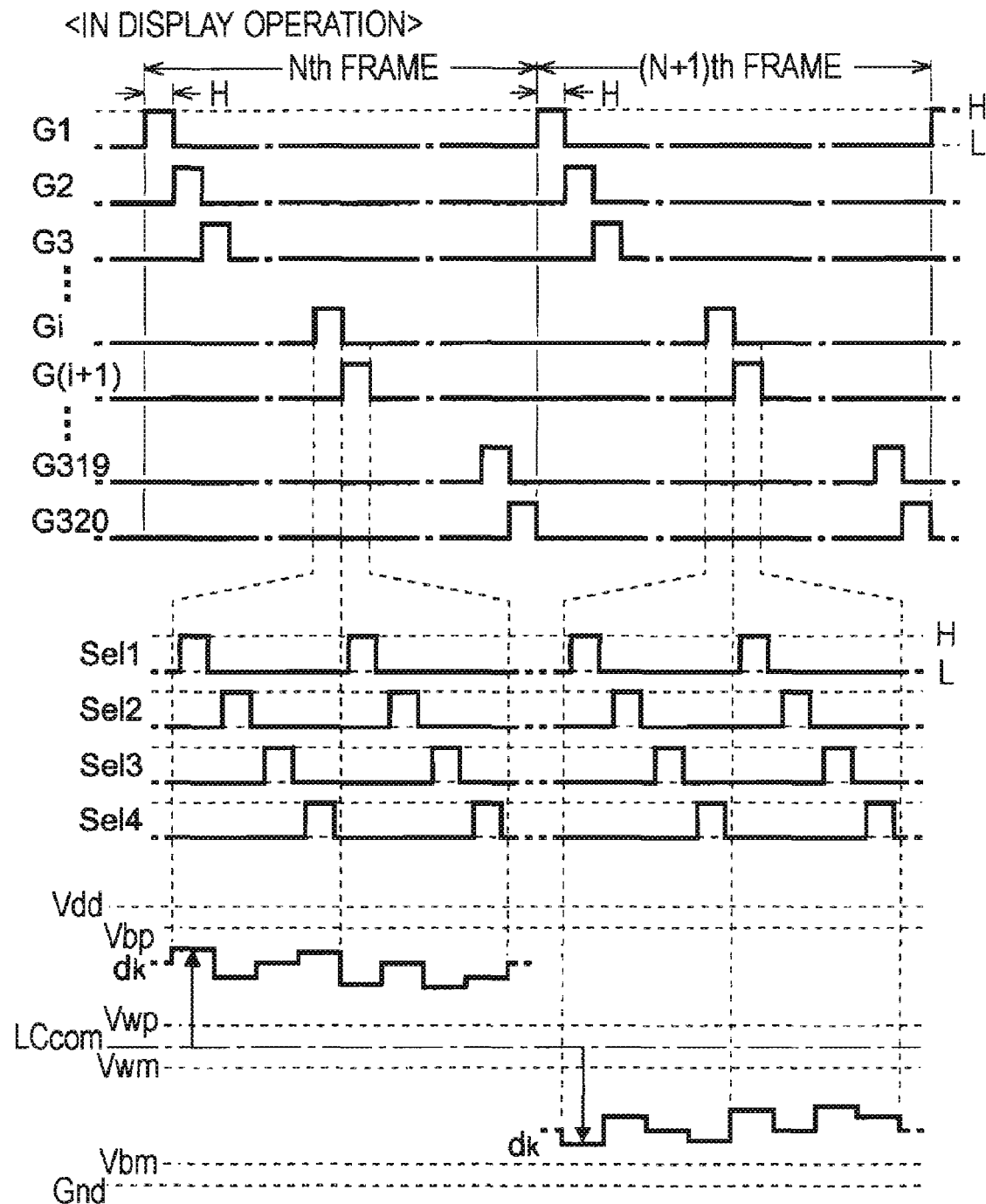
FIG. 5 is a timing chart showing a display operation for the electro-optical device.

Referring to FIG. 5, the scanning line drive circuit 130 sequentially and exclusively sets the scanning signals G1, G2, G3, . . . , and G320 to the H level within a period H of one frame (nth frame).

Within the period H, the control signals Sel1, Sel2, Sel3, and Sel4 supplied from an external control circuit are set to the H level exclusively in that order. In response to the supplied control signals, the data signal supply circuit 140 supplies the data signals d1, d2, d3, . . . , and d120.

More specifically, in a period in which a scanning signal Gi in the ith row is at the H level, when the control signal Sel1 reaches the H level, the data signal supply circuit 140 simultaneously outputs data signals d1, d2, d3, . . . , and d120 with voltages higher than or lower than the voltage LCcom by the voltages corresponding to the grayscale levels of pixels corresponding to the intersections of the ith scanning line 112 and the a-series data lines 114 in association with the 1st, 2nd, 3rd, . . . , and 120th blocks. Since only the control signal Sel1 is at the H level, the a-series data lines 114 are selected (only the TFTs 154 corresponding to the a-series data lines 114 are turned on). Thus, the data signals d1, d2, d3, . . . , and d120 are supplied to the a-series data lines 114 (that is, the data lines 114 in the 1st, 5th, 9th, . . . , and 477th columns). If the scanning signal Gi is at the H level, the TFTs 116 of all the pixels 100 in the ith row are turned on (electrically connected). Thus, the data signals d1, d2, d3, . . . , and d120 supplied to the a-series data lines 114 are applied to the pixel electrodes 118 in the ith row and 1st column, in the ith row and 5th column, in the ith row and 9th column, . . . , and in the ith row and 477th column, respectively.

When the control signal Sel2 reaches the H level, the data signal supply circuit 140 simultaneously outputs the data signals d1, d2, d3, . . . , and d120 having the voltages corresponding to the grayscale levels of pixels corresponding to the intersections of the ith scanning line 112 and the b-series data lines 114 in association with the 1st, 2nd, 3rd, . . . , and 120th blocks. Since only the control signal Sel2 is at the H level, the b-series data lines 114 are selected. Thus, the data signals d1, d2, d3, . . . , and d120 are supplied to the b-series data lines 114 (that, is, the data lines 114 in the 2nd, 6th, 10th, ..., and 478th columns), and the data signals d1, d2, d3, ..., and d120 are applied to the pixel electrodes 118 in the ith row and 2nd column, in the ith row and 6th column, in the ith row and 10th column, ..., and in the ith row and 478th column.

Similarly, in the period in which the scanning signal Gi in the ith row is at the H level, when the control signal Sel3 reaches the H level, the data signal supply circuit 140 simultaneously outputs the data signals d1, d2, d3, ..., and d120 with the voltages corresponding to the grayscale levels of pixels corresponding to the intersections of the ith scanning line 112 and the c-series data lines 114 in association with the 1st, 2nd, 3rd, ..., and 120th blocks. In addition, in the period in which the scanning signal Gi in the ith row is at the H level, when the control signal Sel4 reaches the H level, the data signal supply circuit 140 simultaneously outputs the data signals d1, d2, d3, ..., and d120 with the voltages corresponding to the grayscale levels of pixels corresponding to the intersections of the ith scanning line 112 and the d-series data lines 114 in association with the 1st, 2nd, 3rd, ..., and 120th blocks. Thus, the data signals d1, d2, d3, ..., and d120 are supplied to the c-series data lines (that is, the data lines 114 in the 3rd, 7th, 11th, ..., and 479th columns) to be supplied to the pixel electrodes 118 in the ith row and 3rd column, in the ith row and 7th column, in the ith row and 11th column, and in the ith row and 479th column. Then, the data signals d1, d2, d3, ..., and d120 are supplied to the d-series data lines (that is, the data lines 114 in the 4th, 8th, 12th, ..., and 480th columns) to be supplied to the pixel electrodes 118 in the ith row and 4th column, in the ith row and 8th column, in the ith row and 12th column, and in the ith row and 480th column.

Thus, operations to write the voltages of data signals corresponding to the grayscale levels to pixels in the ith row are completed. Even if the scanning signal Gi falls to the L level, the voltages applied to the pixel electrodes 118 are held until the liquid crystal capacitor 120 performs writing of the next (n+1)th frame.

in the period in which a scanning signal G(i+1) in the next (i+1)th row is at the H level, similarly, voltages corresponding to grayscale levels are written to pixels in the (i+1)th row. Although the writing operation for the ith row and the writing operation for the next (i+1)th row have been explained, writing operations are preformed in the order of the 1st row, the 2nd row, the 3rd row, ..., and the 320th row in that order in the period of each frame. Accordingly, writing to all the pixels in the 1st to 320th rows is completed.

Although similar writing operations are performed in the next (n+1)th frame, the writing polarity to pixels in each row is reversed frame by frame. That is, if positive-polarity writing is performed in the previous nth frame, negative-polarity writing is performed in the current (n+1)th frame. In contrast, if negative-polarity writing is performed in the previous nth frame, positive-polarity writing is performed in the current (n+1)th frame.

As described above, the writing polarity to pixels can be reversed frame by frame. Thus, a direct-current component is not applied to the liquid crystal 105, thus preventing the liquid crystal 105 from being deteriorated.

A data signal dk shown in FIG. 5 is supplied in association with the kth block. If positive-polarity writing is performed, the data signal dk has a voltage higher than the voltage LCcom by the amount corresponding to the grayscale level of a pixel within a range between the voltage Vwp, which corresponds to white, and the voltage Vbp, which corresponds to black. If negative-polarity writing is performed, the data signal dk has a voltage lower than the voltage LCcom by the amount corresponding to the grayscale level of a pixel within a range between the voltage Vwm, which corresponds to white, and the voltage Vbm, which corresponds to black.

For example, the voltage of the data signal dk corresponding to the pixel in the ith row and the (4k−3)th column is higher or lower than the voltage LCcom by the amount corresponding to the grayscale level of the corresponding pixel, as shown by arrows in FIG. 5. Positive voltages Vwp and Vbp and negative voltages Vwm and Vbm are symmetrical to each other with respect to the voltage LCcom.

In this embodiment, the term "writing polarity" means a writing polarity to the liquid crystal capacitor 120. Thus, determination as to whether positive or negative is not based on the ground potential Gnd. The criterion for the determination is based on the voltage LCcom. In FIG. 5, the vertical scale of the voltage of a data line is magnified compared with the other voltage waveforms.

In this embodiment, the criterion for determination of the writing polarity is based on the voltage LCcom applied to the counter electrode 108. This is applied to a case where the TFTs 116 in the pixels 110 function as ideal switches. Actually, due to the parasitic capacitance between the gate and drain of the TFTs 116, when the ON-state is shifted into the OFF-state, a phenomenon in which the potential of the drain (the pixel electrode 118) is reduced, which is called, for example, push-down, punch-through, or field through, occurs. In order to prevent deterioration of liquid crystal, AC driving is basically performed for the liquid crystal capacitor 120. However, when AC driving is performed in accordance with the voltage LCcom to be applied to the counter electrode 108 as the reference of a writing polarity, the voltage effective value of the liquid crystal capacitor 120 based on negative-polarity writing is slightly larger than the effective value based on positive-polarity writing due to push-down (this applies to a case where the TFTs 116 are N-channel transistors). Thus, actually, the reference voltage of a writing polarity is different from the voltage LCcom of the counter electrode 108. More specifically, the reference voltage of a writing polarity is set higher than the voltage LCcom so that an influence of push-down is cancelled out.

In this embodiment, the number of data lines constituting a block is set to "4". However, the number of data lines constituting a block may be "2" or more. For example, if the number of data lines constituting a block is, for example, "8", the checking circuit 160 includes read lines for signals Cx1 to Cx8 in association with the data lines constituting the block.

In addition, in this embodiment, in a checking operation, the checking control circuit supplies data signals d1, d2, d3, ..., and d120. However, similarly to the production stage, a data signal supply circuit may be connected so as to cause the data signal supply circuit to supply the data signals.

In this embodiment, an example in which a liquid crystal device is used as an electro-optical device has been described. However, the invention is applicable to a device using electronic luminance (EL) elements, electron emission elements, electrophoresis elements, or the like as pixels or a plasma display device as long as the device is based on a demultiplexer system in which data signals to be supplied to n (n is an integer of 2 or more) data lines are input in a time-division manner and the n data lines are selected one by one in the time-division manner.

Figure 6:
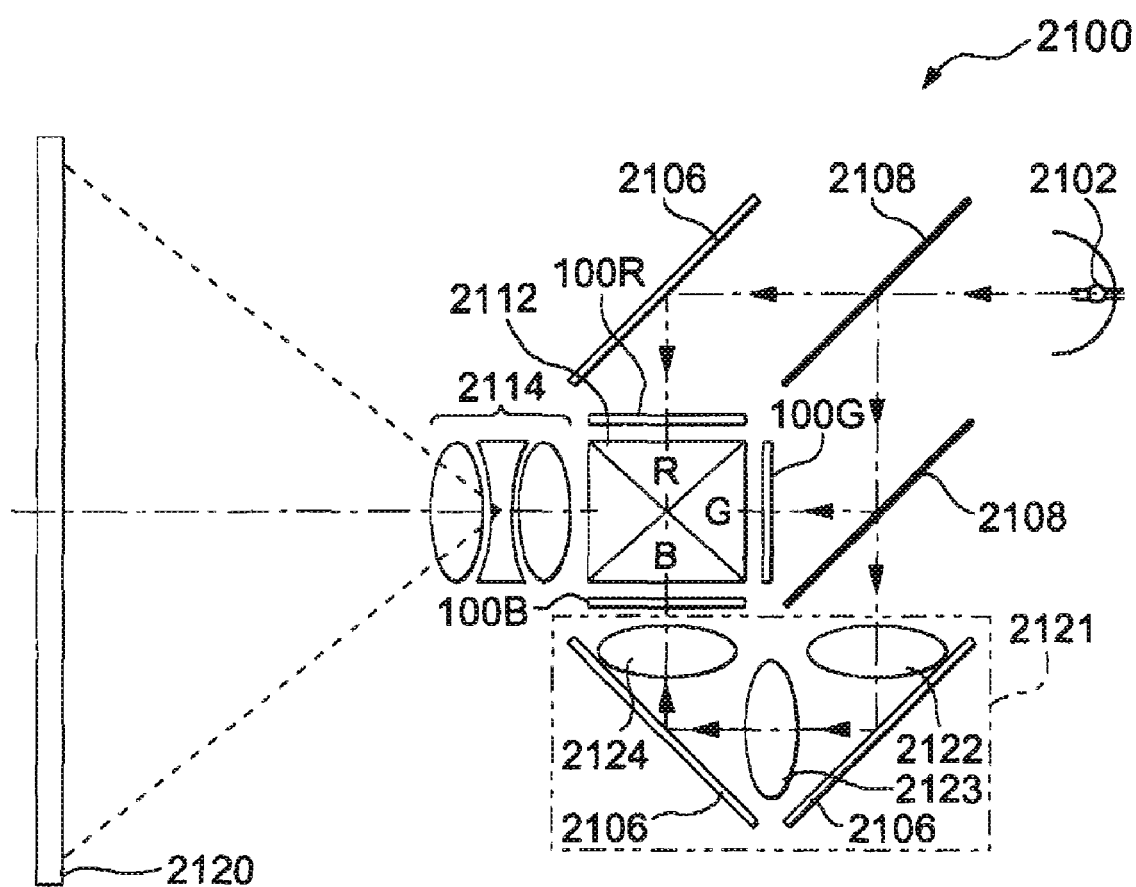
FIG. 6 shows a configuration of a projector using the electro-optical device according to an embodiment of the invention.

An example of an electronic apparatus using the electro-optical device according to the foregoing embodiments will be described. FIG. 6 shows a configuration of a three-plate projector 2100 using the display area 100 in the electro-optical device 10 as a light valve.

In the projector 2100, light to be incident to the light valve is separated into three primary colors, such as a red (R) beam, a green (G) beam, and a blue (B) beam by three mirrors 2106 and two dichroic mirrors 2108 contained in the projector 2100, and the beams of the three primary colors are guided to light valves 100R, 100G, and 100B for the corresponding colors. Blue beams have an optical path longer than that of red beams or green beams. Thus, in order to prevent optical loss, the blue beam is guided through a relay lens system 2121 including an incident lens 2122, a relay lens 2123, and an emission lens 2124.

The configuration of each of the light valves 100R, 100G, and 100B is similar to that of the display area 100 of the electro-optical device 10 in the foregoing embodiments. Each of the light valves 100R, 100G, and 100B is driven in accordance with image data for corresponding R, G, and B colors supplied from an external host circuit (not shown).

Beams modulated by the light valves 100R, 100G, and 100B are incident to a dichroic prism 2112 from three directions. In the dichroic prism 2112, the red beam and the blue, beam are refracted at 90 degrees, and the green beam goes straight. Thus, after the images of the respective colors are combined, a lens unit 2114 enlarges and projects a non-inverted image. Thus, a color image is displayed on a screen 2120.

Transmission images formed by the light valves 100R and 100B are reflected by the dichroic prism 2112 and then projected. In contrast, a transmission image formed by the light valve 100G is immediately projected. Thus, the direction of horizontal scanning performed by the light valves 100R and 100B is opposite to the direction of horizontal scanning performed by the light valve 100G, so that left-right inverted image can be displayed.

In addition to the example described with reference to FIG. 6, a direct viewing type, such as a cellular phone, a personal computer, a television, a monitor of a video camera, a car navigation apparatus, a pager, an electronic notebook, an electronic calculator, a word processor, a work station, a television telephone, a point of sale (POS) terminal, a digital still camera, an apparatus provided with a touch panel, or the like may be used as an electronic apparatus. In addition, an electro-optical device according to an embodiment of the invention can be applied to an electronic apparatus of various types.

The entire disclosure of Japanese Patent Application No. 2006-026008, filed Feb. 2, 2006 is expressly incorporated by reference herein.

What is claimed is:

1. A substrate for an electro-optical device, comprising:
a plurality of scanning lines arranged in rows;
a plurality of data lines arranged in columns and grouped into blocks, each of the blocks including n data lines, where n indicates an integer of 2 or more;
a plurality of terminals that receive data signals for the corresponding blocks;
a demultiplexer that selects a data line designated by a control signal from among the n data lines within each of the blocks and that supplies to the data line selected in the block the corresponding data signal received by the corresponding terminal for the block;
a plurality of pixels disposed in association with intersections of the plurality of scanning lines and the plurality of data lines, some or all of the plurality of pixels performing display in accordance with the data signals supplied to the data lines when selection of the corresponding scanning lines is performed; and
a checking circuit,
wherein the checking circuit includes
n read lines,
a plurality of first switches each provided for a different data line, one end of each of the plurality of first switches being connected to a corresponding data line and the other end of each of the plurality of first switches being connected to one of the n read lines such that the other ends of the plurality of first switches corresponding to the n data lines belonging to an identical block are connected to different read lines, and
a shift register that selects one of the blocks so as to allow conduction of first switches whose other ends are connected to the n data lines belonging to the selected block.

2. The substrate for the electro-optical device according to claim 1,
wherein the shift register outputs a shift signal in accordance with the selection of the block via a corresponding one of a plurality of output terminals of the shift register,
wherein each of the plurality of first switches includes a transistor whose gate receives the shift signal, and
wherein the checking circuit further includes a plurality of second switches each causing a corresponding output terminal of the shift register to have an OFF voltage of the transistor forming the corresponding first switch when the plurality of pixels perform display.

3. The substrate for the electro-optical device according to claim 1, wherein the checking circuit is formed on a side opposite to the demultiplexer such that an alignment area of the plurality of pixels is arranged between the checking circuit and the demultiplexer.

4. A method for checking an electro-optical device including a plurality of scanning lines arranged in rows, a plurality of data lines arranged in columns and grouped into blocks, each of the blocks including n data lines, where n indicates an integer of 2 or more, a plurality of terminals that receive data signals for the corresponding blocks, a demultiplexer that selects a data line designated by a control signal from among the n data lines within each of the blocks and that supplies to the selected data line the corresponding data signal received by the corresponding terminal, a plurality of pixels disposed in association with intersections of the plurality of scanning lines and the plurality of data lines, some or all of the plurality of pixels performing display in accordance with the data signals supplied to the data lines when selection of the corresponding scanning lines is performed, and a checking circuit, wherein the checking circuit includes n read lines and a plurality of first switches each provided for a different data line, one end of each of the plurality of first switches being connected to a corresponding data line and the other end of each of the plurality of first switches being connected to one of the n read lines such that the other ends of the plurality of first switches corresponding to the n data lines belonging to an identical block are connected to different read lines, the method comprising:
supplying a data signal of a predetermined voltage to a terminal corresponding to at least one block from among the plurality of terminals;
supplying to the demultiplexer a control signal for deselecting all the n data lines grouped into the blocks;
turning on first switches whose other ends are connected to the n data lines belonging to the at least one block corresponding to the terminal to which the data signal of the predetermined voltage is supplied; and
determining whether or not all the n read lines are at the predetermined voltage.

5. A method for checking an electro-optical device including a plurality of scanning lines arranged in rows, a plurality of data lines arranged in columns and grouped into blocks, each of the blocks including n data lines, where n indicates an integer of 2 or more, a plurality of terminals that receive data signals for the corresponding blocks, a demultiplexer that selects a data line designated by a control signal from among the n data lines within each of the blocks and that supplies to the selected data line the corresponding data signal received by the corresponding terminal, a plurality of pixels disposed in association with intersections of the plurality of scanning lines and the plurality of data lines, some or all of the plurality of pixels performing display in accordance with the data signals supplied to the data lines when selection of the corresponding scanning lines is performed, and a checking circuit, wherein the checking circuit includes n read lines and a plurality of first switches each provided for a different data line, one end of each of the plurality of first switches being connected to a corresponding data line and the other end of each of the plurality of first switches being connected to one of the n read lines such that the other ends of the plurality of first switches corresponding to the n data lines belonging to an identical block are connected to different read lines, the method comprising:

supplying a data signal of a predetermined voltage to a terminal corresponding to at least one block from among the plurality of terminals;

supplying to the demultiplexer a control signal for selecting one of the n data lines grouped into the blocks;

turning on first switches whose other ends are connected to the n data lines belonging to the at least one block corresponding to the terminal to which the data signal of the predetermined voltage is supplied; and determining whether or not a read line connected to the other end of the first switch corresponding to the one of the n data lines selected by the demultiplexer from among the n read lines is at the predetermined voltage.

* * * * *